(12) United States Patent
Shibuya

(10) Patent No.: US 6,257,221 B1
(45) Date of Patent: Jul. 10, 2001

(54) CUTTING MACHINE

(76) Inventor: Shouichi Shibuya, 3-6, Hachiman 2 Chome, Aoba-ku, Sendai-shi, Miyagi prefecture (JP)

( * ) Notice: Subject to any disclaimer, the term of this patent is extended or adjusted under 35 U.S.C. 154(b) by 0 days.

(21) Appl. No.: 09/396,725

(22) Filed: Sep. 15, 1999

(30) Foreign Application Priority Data

Oct. 2, 1998 (JP) .................................................. 10-294713

(51) Int. Cl.[7] .................................................. B28D 1/00
(52) U.S. Cl. .............................. 125/8; 125/13.01; 125/14
(58) Field of Search .................... 125/13.01, 12, 125/8, 14

(56) References Cited

U.S. PATENT DOCUMENTS

| | | | |
|---|---|---|---|
| 1,852,387 | * 4/1932 | Wieden | 125/13.01 |
| 2,011,984 | * 8/1935 | Rosenberger | 125/13.01 |
| 2,569,291 | * 9/1951 | Davis | 125/13.01 |
| 2,736,311 | * 2/1956 | Coates | 125/13.01 |

* cited by examiner

Primary Examiner—Joseph J. Hail, III
Assistant Examiner—Lee Wilson
(74) Attorney, Agent, or Firm—Lorusso & Loud

(57) ABSTRACT

A cutting machine including a base connected to an end of an arm of a construction machine with a pin. A cutter mounting assembly is rotatable relative to the base, and a rotary cutter is mounted on the cutter mounting assembly. The cutter mounting assembly has a fixed portion and a movable portion, a drive device that extends and retracts linearly disposed on the fixed portion, a rotary cutter disposed on the movable portion, the rotary cutter mounting assembly being rotatable relative to the base.

16 Claims, 2 Drawing Sheets

CUTTING MACHINE

BACKGROUND OF THE INVENTION

1. Field of the Invention

The present invention relates to a cutting machine that is disposed at an end of an arm of a civil construction machine such as a backhoe and that is adapted for cutting a large and hard material such as a concrete pipe on site.

2. Description of the Prior Art

Conventionally, a desired attachment is selectively mounted on an end of an arm of a backhoe or the like so as to perform a desired civil construction task other than work using a bucket. On a civil construction site, concrete products may be manually cut. Such work is dangerous and results in worker's accidents. To solve the problem, the inventor of the present invention has proposed a cutting machine that can be attached to the bucket of a backhoe (as disclosed in Japanese Patent Laid-Open Publication No. 1-207507).

However, since the cutting machine is fixed to the bucket, the cutting of the rotating cutter is limited to one direction. Thus, the user cannot freely select the cutting surface direction of the rotary cutter.

An object of the present invention is to provide a cutting machine that is disposed at an end of an arm of a backhoe or the like and that allows freely selecting the cutting surface angle of a rotary cutter.

SUMMARY OF THE INVENTION

The present invention is a cutting machine comprising a base means connected to an end of an arm with a pin, a cutter mounting means rotatable relative to the base means, and a rotary cutter means mounted on the cutter mounting means, wherein the cutter mounting means has a fixed portion and a movable portion, a moving means that extends and retracts in one direction being disposed on the fixed portion, a rotary cutter being disposed on the movable portion.

The cutting machine further comprises two angle setting means that mate with each other and that are disposed between the base means and the cutter mounting means, wherein the two angle setting means allow the cutting surface of the rotary cutter to be freely oriented.

The cutting machine further comprises a hydraulic motor disposed between the base means and the cutter mounting means, whereby the orientation of the cutting surface of the rotary cutter of the rotary cutter means relative to the base means is freely changed by controlling the rotation of the hydraulic motor.

The cutting machine further comprises a compression spring disposed between the base means and the cutter mounting means.

The cutter mounting means is composed of an outer cylinder means and an inner cylinder means. The inner cylinder means is fixed. The outer cylinder means is movable. An actuator is disposed between the outer cylinder means and the inner cylinder means. The outer cylinder means is moved by the actuator so that the rotary cutter is travels at a constant speed.

The actuator has a built-in hydraulic pump and is driven by a hydraulic circuit connected to an external device.

The cutting machine further comprises two angle setting plates that mate with each other and that are disposed between the base means and the rotary cutter mounting means. Corresponding to the angle that is set with the two angle setting plates, the surface of the rotating cutter is freely changed. The rotating cutter mounting means is composed of an outer cylinder means and an inner cylinder means. The inner cylinder means is fixed. The outer cylinder means is movable. An actuator is disposed between the inner cylinder means and the outer cylinder means. With the actuator, the outer cylinder means is moved so that the rotary cutter travels at a predetermined speed.

When necessary, the shaft can be rotated 30°, 45°, 90°, 120°, 180°, or the like to a reference position. The shaft can be fixed at the selected angle. At the set angle, the rotating cutter is moved in the axial direction so as to cut a concrete product/material or the like. Thus, the cutting machine according to the present invention allows the user to more safely perform a civil construction task than with a manual cutting machine. In addition, since the rotary cutter stably travels at a constant speed, an excessive load is not applied to the rotary cutter. Thus, the blade of the rotary cutter can be prevented from being broken.

DESCRIPTION OF THE PREFERRED EMBODIMENT

Figure 1:
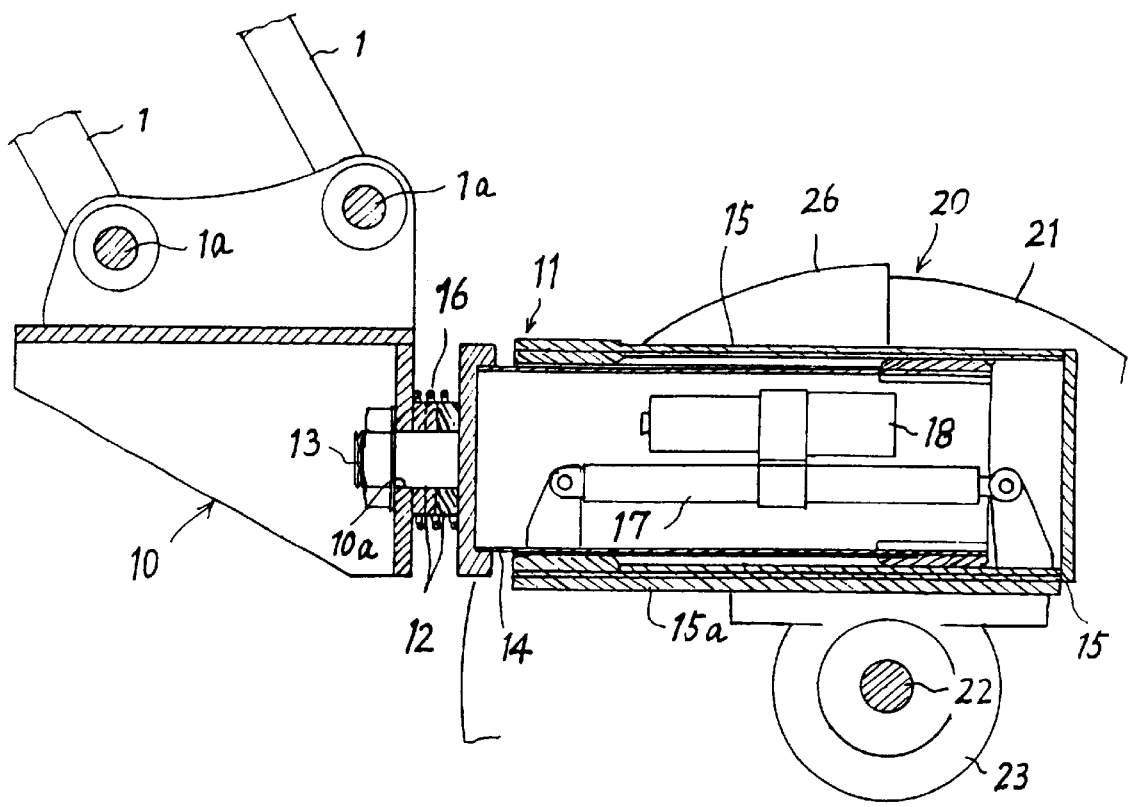
FIG. 1 is a sectional view of a cutting machine of the present invention.
Figure 2:
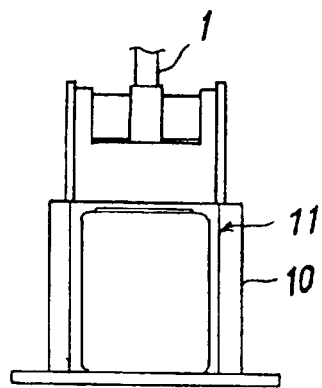
FIG. 2 is a right side view of the cutting machine of FIG. 1.
Figure 3:
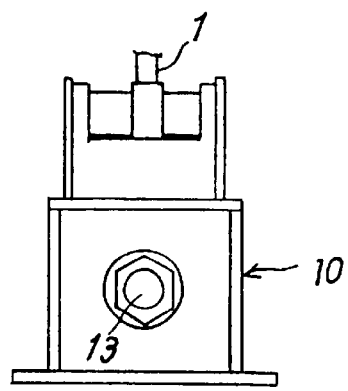
FIG. 3 is a left side view of the cutting machine of FIG. 1.

In FIG. 1, reference numeral 1 represents two arm end portions of a construction machine such as a backhoe. With two pins 1a, a link is formed. A base 10 forms a supporting portion for a pin that mounts a rotary cutter mounting means 11 on the arm end portions 1. A hole 10a is formed at a lower position of the base 10. The hole 10a allows the rotary cutter mounting means to be rotatably fixed. As shown in FIG. 1, the rotary cutter mounting means 11 is composed of an inner ceratoid cylinder portion 14 and an outer ceratoid cylinder portion 15. A center bolt 13 is disposed on one end of the inner ceratoid cylinder portion 14. The center bolt 13 extends through the hole 10a of the base 10. Two angle setting plates 12 are mounted on the center bolt 13 in such a manner that the two angle setting plates 12 mate with each other. The first angle setting plate 12 is fixed to the base 10. The second angle setting plate 12 is fixed to the rotary cutter mounting means 11.

Figure 4:
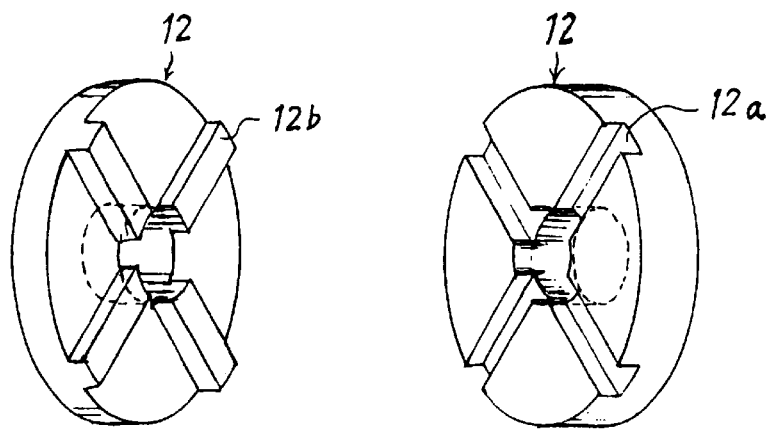
FIG. 4 is a perspective view of a pair of the angle setting means.

As shown in FIG. 4, one of the angle setting plates 12 has concave portions 12a formed at intervals of 90°. The other angle setting means 12 has convex portions 12b formed at intervals of 90°. The concave portions 12a of the angle setting means 12 fit in the convex portions 12b of the angle setting means 12. Thus, the angle setting means 12 can be rotated at intervals of 90°. When the concave portions 12a of one angle setting means 12 seat in the convex portions 12b of the other angular setting means 12, the angular position is fixed. It should be noted that the angles of intervals of the concave portions 12a and the convex portions 12b can be freely set. For example, the concave portions 12a and the convex portions 12b may be formed at intervals of 15°, 30°, or 45°. When the angle of the intervals of the concave portions 12a and the convex portions 12b is 15°, the number of the concave portions 12a and the convex portions 12b is 24 each. When the angle of the intervals of the concave portions 12a and the convex portions 12b is 30°, the number of the concave portions 12a and the convex portions 12b is 12 each. When the angle of the intervals of the concave portions 12a and the convex portions 12b is 45°, the number of the concave portions 12a and the convex portions 12b is 8 each.

In FIG. 1, a compression spring 16 is shown disposed between the base 10 and the rotary cutter mounting means 11. When a nut 10 is loosened, the compression spring 16 causes the angle setting means 12 to separate. Thus, the angle of the rotary cutter mounting means 11 can be easily changed.

Alternatively, a hydraulic motor may be disposed between the base 10 and the rotary cutter mounting means 11 so as to variably set the angle of the rotary cutter mounting means 11. A part of the hydraulic motor circuit (for example, an operation lever) may be disposed in the construction machine which carries the cutting mechanism of the present invention. In this case, the user can operate the lever in the operator cab of the construction machine so as to drive the hydraulic motor.

One end of an actuator 17 is fixed to the inner cylinder portion 14 that is also fixed. The other end of the actuator 17 is fixed to the outer cylinder portion 15 that is movable. The actuator 17 is a linear actuator (Kayaba Kogyo. K. K., trade mark "Mini Motion Package"). The linear actuator is composed of a hydraulic circuit and a metal cover that houses the hydraulic circuit. The hydraulic circuit is composed of a cylinder portion, an electric motor, a hydraulic pump, a valve, an oil tank, and so forth.

Thus, the extending and retracting operations of the actuator 17 cause the outer cylinder portion 15 to move telescopically relative to the inner cylinder portion 14. The actuator 17 is driven by a built-in hydraulic pump 18 with a power supply of 12 V. To allow the outer cylinder portion 15 to smoothly slide on the inner cylinder portion 14, a member that has high wear resistance and high lubricity is disposed between the outer cylinder portion 15 and the inner cylinder portion 14.

Figure 5:
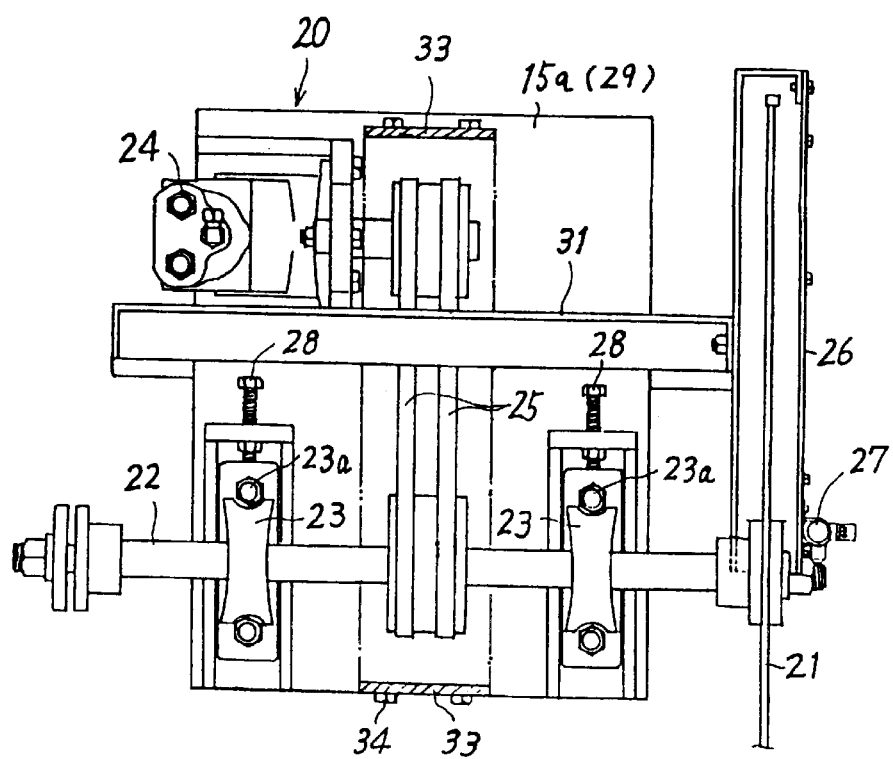
FIG. 5 is a top plan view of a rotary cutting means of the present invention.

A rotary cutter assembly 20 is disposed on one side of the outer cylinder portion 15. As shown in FIGS. 1 and 5, the rotary cutter assembly 20 is composed of a rotatable shaft 22, two bearings 23, a hydraulic motor 24, and a belt 25 that are disposed on a base plate 15a. A rotary cutter blade 21 is disposed on one end of the rotary shaft 22. The two bearings 23 bear the rotary shaft 22. The two bearings 23 are fixed with bolts 23a. The belt 23a transmits the motion of the hydraulic motor 24 to the rotating shaft 22. To prevent the user from being injured by the moving belt 25, a cover 33 is fixed to the base plate 15 with bolts 34. A semi-circular cover 26 is disposed in the vicinity of the rotary cutter blade 21 so as allow the user to safely operate the cutting machine. The outer diameter of the rotating cuter blade 21 is about 50 cm to 200 cm. The cover 26 is held by a stay 31 disposed on the base plate 15a. To remove heat from the rotary cutter blade 21, a spray shower 27 is provided. The spray shower 27 sprays water onto the edge of the rotary cutter blade 21. The hydraulic pressure of the hydraulic motor 24 may be supplied from the main body of the construction machine. The bearings 23 can be moved with push screws 28 so as to adjust the tension of the belt 25.

In forming the cutter assembly 20, each part thereof may be disposed on base plate 29 instead of the base plate 15a so as to allow the rotary cutter assembly 20 to be removed from the outer cylinder portion 15.

Thus, as shown in FIG. 1, in the cutting machine disposed at an end of the arm of the construction machine, after the angle of the cutting machine is set with the angle setting plates 12, the speed of movement of the actuator 17 is selected corresponding to the material of the object(s) to be cut. Thus, the rotary cutter blade 21 travels linearly through the stroke of the actuator 17 so as to cut a concrete product or the like. When the cutting depth is changed, as by moving the bucket, the positions of the pins at the ends of the arms of the construction machine are changed by adjusting the hydraulic valve.

In this case, the hydraulic circuit of the actuator may have a circuit that causes the actuator to extend at high speed and to retract at low speed. The cutting depth may be automatically set corresponding to output signals of various sensors disposed in the cutting machine. In addition, when the actuator extends through a predetermined stroke, the operation of the spray shower and the rotation of the rotary cutter may be stopped so as to reduce noise and danger to the cutting machine.

As described above, the present invention is a cutting machine comprising a base connected to an end of an arm with a pin, a cutter mounting means rotatably attached to the base, and a rotary cutter mounted on the rotary cutter mounting means, wherein the rotary cutter mounting means has a fixed portion and a movable portion, a drive means that linearly extends and retracts and is disposed on the fixed portion, a rotary cutter disposed on the movable portion, the rotary cutter mounting means being rotatable relative to the base. Thus, the angular orientation of the cutting surface of the rotary cutter is not limited as with the conventional cutting machines. Since the cutting surface can be freely set, a work material such as a concrete pipe can be cut at a right angle. In addition, when concrete pipes are connected in an L shape, the connection portion can be cut at 45°. Thus, the cutting machine according to the present invention allows the user to more safely perform a civil construction task than a manual cutting machine. In addition, since the rotary cutter stably travels at a constant speed, an excessive load is not applied to the rotary cutter and the blade of the rotary cutter is thereby prevented from being broken.

Although the foregoing describes a preferred embodiment and alternatives thereof of the invention, it is understood that the invention is not to be limited thereto, except in so far as such limitations are included in the following claims, and the present invention includes allowable functional equivalents thereof.

What is claimed is:

1. A cutting machine comprising:
   a base connected to an end of an arm;
   cutter mounting means comprising:
   a fixed inner cylinder portion;
   a movable outer cylinder portion fitted over said inner cylinder portion for sliding movement thereon;
   drive means that extends and retracts linearly and is disposed on said fixed inner cylinder portion;
   rotary cutter means mounted on said outer cylinder portion of said cutter mounting means;
   a pair of angle setting means, which mate with each other and which are disposed between said base and said cutter mounting means, for selectively setting an angular orientation of a cutting surface of said rotary cutter means.

2. The cutting machine as claimed in claim 1 wherein said pair of angle setting means comprise:

a compression spring disposed between said base and said cutter mounting means;

one angle setting plate having concave portions formed at an angular interval selected from 15°, 30°, 45° and 90°; and a second angle setting plate having convex portions for mating with said concave portions and formed at an angular interval selected from 15°, 30°, 45° and 90°.

3. The cutting machine as claimed in claim 1 wherein said drive means is an actuator having one end fixed to said inner cylinder portion and a second end fixed to said outer cylinder portion and comprises a built-in pump for fluidically driving said actuator to extend and retract.

4. The cutting machine as claimed in claim 1 wherein said drive means is an actuator having one end fixed to said inner cylinder portion and a second end fixed to said outer cylinder portion and comprises an external pump for fluidically driving said actuator to extend and retract.

5. The cutting machine as claimed in claim 1 wherein said rotary cutter means comprises:

a rotatable shaft;

bearings supporting said rotatable shaft;

a hydraulic motor;

a belt for transmitting rotary motion from said hydraulic motor to said rotatable shaft; and a rotatable cutter blade disposed on said rotatable shaft.

6. The cutting machine as claimed in claim 5 wherein said rotary cutter means further comprises:

a spray shower disposed on a cover of said rotatable cutter blade for spraying water onto a cutting surface of the rotatable cutter blade.

7. The cutting machine as claimed in claim 6 wherein said spray shower comprises means for stopping operation of said spray shower so as to reduce noise of said cutting machine when said built-in actuator extends to a predetermined extent.

8. The cutting machine as claimed in claim 5 wherein said rotary cutter means further comprises:

means for stopping rotation of said rotatable cutter blade so as to reduce noise and danger when said built-in actuator extends to a predetermined extent.

9. A cutting machine comprising:

a base connected to an end of an arm;

rotary cutter mounting means comprising:

a fixed assembly;

a movable assembly;

drive means that extends and retracts linearly having one end fixed to said fixed assembly;

rotary cutter means mounted on said rotating cutter mounting means and disposed on said movable assembly;

a hydraulic motor disposed between said base and said rotary cutter mounting means, whereby an angle between a cutting surface of said rotary cutter and said base is changed by controlling rotation of said hydraulic motor.

10. The cutting machine as claimed in claim 9 additionally comprising a pair of angle setting means and a compression spring disposed between said base and said rotary cutter mounting means.

11. The cutting machine as claimed in claim 9 wherein said rotary cutter mounting means comprises:

a fixed inner cylinder member, a movable outer cylinder member;

a drive means that extends and retracts linearly and is disposed on said fixed inner cylinder member; and wherein said rotary cutter is mounted on said movable cylinder member and said rotary cutter mounting means is rotatable relative to said base.

12. The device as claimed in claim 11 wherein said drive means is a built-in actuator having one end fixed to said inner cylinder member; and wherein said drive means comprises a built-in pump.

13. The device as claimed in claim 4 wherein said drive means is a built-in actuator having one end fixed to said inner cylinder member; and wherein said drive means comprises an external pump.

14. The cutting machine as claimed in claim 9 wherein said rotary cutter means comprises:

a rotatable shaft;

bearings supporting said rotatable shaft;

a hydraulic motor;

a belt for transmitting rotary motion from said hydraulic motor to said rotatable shaft; and a rotatable cutter blade disposed on said rotatable shaft.

15. The cutting machine as claimed claim 14 wherein said rotary cutter means further comprises:

a spray shower disposed on a cover of said rotatable cutter blade for spraying water onto a cutting surface of the rotatable cutter blade.

16. The cutting machine as claimed in claim 15 wherein said spray shower comprises means for stopping operation of said spray shower so as to reduce noise of said cutting machine when said built-in actuator extends to a predetermined extent.

\* \* \* \* \*

UNITED STATES PATENT AND TRADEMARK OFFICE
CERTIFICATE OF CORRECTION

PATENT NO.    : 6,257,221 B1
DATED         : July 10, 2001
INVENTOR(S)   : Shibuya It is certified that error appears in the above-identified patent and that said Letters Patent is hereby corrected as shown below:

<u>Column 6,</u>
Line 26, delete "4" and insert -- 11 --.

Signed and Sealed this

Thirteenth Day of August, 2002

Attest:

Attesting Officer

JAMES E. ROGAN
*Director of the United States Patent and Trademark Office*